United States Patent
Chang et al.

(10) Patent No.: US 8,027,338 B2
(45) Date of Patent: Sep. 27, 2011

(54) DISCONTINUING THE IMPLEMENTATION OF AN AGGREGATION PROTOCOL

(75) Inventors: Darda M. Chang, Austin, TX (US); Michael Sean McGee, Austin, TX (US); Mark C. Stratton, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 985 days.

(21) Appl. No.: 11/469,180

(22) Filed: Aug. 31, 2006

(65) Prior Publication Data

US 2008/0056247 A1 Mar. 6, 2008

(51) Int. Cl.
*H04L 12/56* (2006.01)
(52) U.S. Cl. .................................. 370/389; 370/400
(58) Field of Classification Search .................. None
See application file for complete search history.

(56) References Cited

U.S. PATENT DOCUMENTS

| | | | |
|---|---|---|---|
| 5,202,985 A * | 4/1993 | Goyal | 709/218 |
| 5,959,968 A * | 9/1999 | Chin et al. | 370/216 |
| 6,807,179 B1 * | 10/2004 | Kanuri et al. | 370/395.31 |
| 7,411,915 B1 * | 8/2008 | Spain et al. | 370/250 |
| 2002/0110148 A1 * | 8/2002 | Hickman et al. | 370/475 |
| 2005/0038878 A1 * | 2/2005 | McGee et al. | 709/220 |
| 2005/0238018 A1 * | 10/2005 | Devi et al. | 370/389 |
| 2006/0256814 A1 * | 11/2006 | Caci | 370/466 |

* cited by examiner

*Primary Examiner* — Chirag Shah
*Assistant Examiner* — Salvador E Rivas

(57) ABSTRACT

A method comprises on a first port, receiving a frame from a network device and determining whether the received frame includes a system identifier (ID) that matches a system ID corresponding to a second port. If the received frame's system ID matches the second port's system ID, the method further comprises discontinuing an aggregation protocol that otherwise enables multiple ports to be operated together as a virtual port.

11 Claims, 3 Drawing Sheets

DISCONTINUING THE IMPLEMENTATION OF AN AGGREGATION PROTOCOL

BACKGROUND

In some networks, servers are employed that have multiple network interface controllers (NICs). Some such servers employ a protocol which enables groups of such NICs to function together as a "team." A team of NICs may have a single address (e.g., an Internet Protocol (IP) address) which facilitates communication through the team of NICs. To other logic and drivers, the team of NICs appears to be, and is interacted with as, a single NIC.

Servers typically connect to other servers or network devices through one or more network switches. A switch typically comprises multiple ports. The concept of "teaming" (or port aggregation or port trunking) can be applied to switches as well as to servers to permit groups of ports to function together as a team. On industry standard example of this type of functionality is described in IEEE 802.3ad.

An aggregation protocol may be employed to permit aggregation-based servers and aggregation-based switches, or other aggregation-based network devices, to discover each other's teaming capability. An aggregation protocol permits multiple aggregation-based network devices to discover that the devices have two or more physical ports in common that can be "bound" together as a single virtual port. Unfortunately, connecting a network device into such a network that does not comply with the aggregation protocol of the other network devices, or does not implement an aggregation protocol at all, may result in erroneous network behavior.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

The term "port" is used in this description as well as network interface controller (NIC). The term port is used to refer to a port on a network switch (a switch port) or a NIC which may be included in a computer such as a server, storage device, etc. A NIC can have one or more NIC ports. A team can comprise two or more ports associated with one or more NICS.

DETAILED DESCRIPTION

Figure 1:
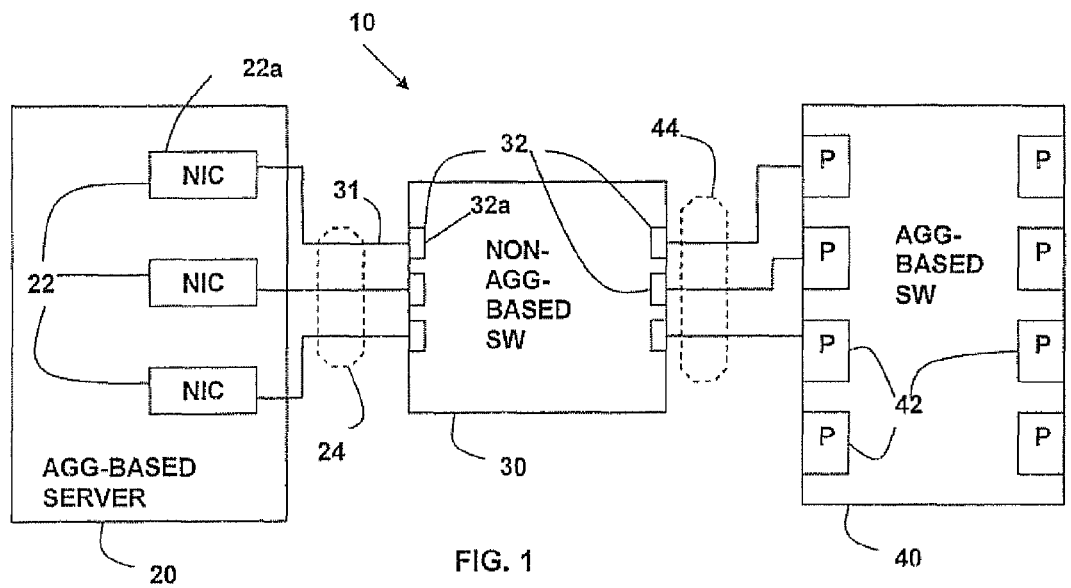
FIG. 1 shows a network in accordance with embodiments of the invention.

FIG. 1 shows a system 10 in accordance with an embodiment of the invention. As shown, system 10 comprises a computer 20 (e.g., a server) coupled to a switch 30 which, in turn, couples to another switch 40. The server 20 comprises one or more network interface controllers (NICs) 22 that enable the server 20 to send frames to and receive frames from switch 30. Frames contain data, commands, or other types of information and may be referred to by different names such as "packets."

Each switch 30, 40 comprises one or more ports such as ports 32 and 42 illustrated with respect to switches 30 and 40, respectively. Each port 32, 42 can receive a frame from an external device connected to that port or transmit a frame to such a connected device. For example, port 32a on switch 30 can receive a frame transmitted from NIC 22a of server 20 via communication link 31. Switch 30 can also output a frame through port 32a to NIC 22a via link 31. Thus, in at least some embodiments, the ports are bi-directional. In other embodiments, one or more of the ports may be uni-directional only.

Figure 2:
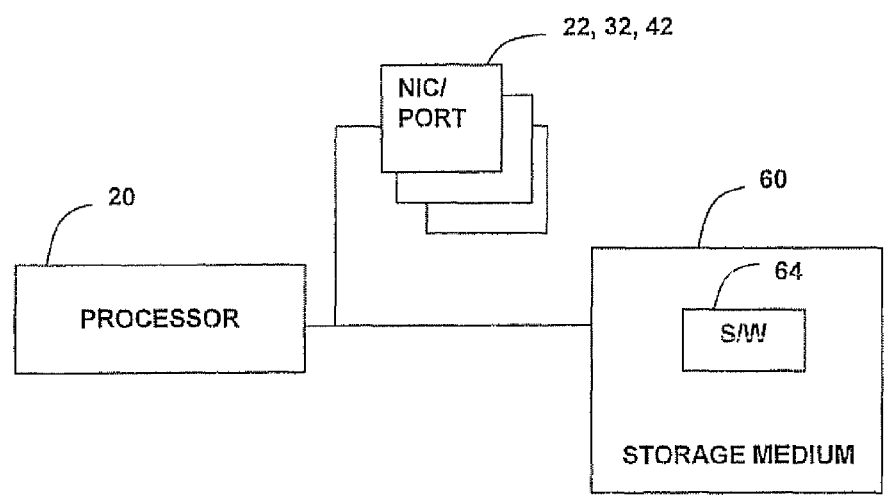
FIG. 2 shows an embodiment of one or more components of the network of FIG. 1 in accordance with embodiments of the invention.

FIG. 2 illustrates an embodiment of the server 20. The same architecture may also be implemented in the switch 30 and/or switch 40. As shown, the server 20 (or switches 30, 40) comprises a processor 50 that executes software 64 stored on a storage medium 60. The storage medium 60 comprises volatile memory such as random access memory (RAM), non-volatile storage such as read only memory (ROM), a hard disk drive, a compact disc read only memory (CD ROM), a Flash memory device, or a combination of volatile memory and non-volatile storage. The processor 50 couples to the storage medium 60 as well as the NICs 22 (or ports 32, 42 in the context of servers 30, 40). In at least some embodiments, some or all of the functionality described herein is performed by software 64 (i.e., the processor 50 executing software 64). In other embodiments, the functionality described herein is performed in hardware or combinations of hardware and software.

Referring again to FIG. 1, the NICs 22 may be contained within the server 20 or may be external devices coupled to the server 20. One or more of the NICs 22 can be functionally combined together to form a team. The constituent NICs are referred to as "team members." A team of NICs may have one or more addresses (e.g., an IP address) which facilitates communication through the team of NICs. To other logic and drivers within the server 20, the team of NICs appears, and is interacted with, as a single NIC. In FIG. 1, all three of NICs 22 are illustrated as being functionally combined together to form a single team 24. In some embodiments, fewer than all NICs can be combined together to form a team. In yet other embodiments, more than one team of NICs can be formed. U.S. Patent Pub. No. 2005/0038878 entitled "Network Controller" provides additional information about forming teams and is herein incorporated by reference. Because server 20 can form teams from among its NICs 22, server 20 is referred to as a "aggregation-based server."

One or more of the ports 42 of switch 40 can also be combined together to form a team (or port aggregation as defined by the IEEE 802.3ad specification), such as team 44. The constituent ports forming the team are called "team members." Because switch 40 can form teams from among its ports 42, switch 40 is referred to as a "aggregation-based switch." In accordance with embodiments of the invention, the aggregation-based server 20 and aggregation-based switch 40 implement an "aggregation" protocol. An aggregation protocol enables two network devices (e.g., a server and a switch, two servers, two switches, etc.) to discover each other's teaming capability. An aggregation protocol permits multiple aggregation-based network devices to discover that the devices have two or more physical ports in common that can be "bound" together as a single virtual port. An aggregation protocol comprises rules and methods that allow two systems to agree on the ports to operate together to form a virtual port functioning as a single link. An example of an aggregation protocol is the IEEE 802.3ad link aggregation control protocol (LACP) and other aggregation protocols are possible as well (e.g., Cisco System's Port Aggregation Protocol-PagP).

At least some aggregation protocols assume a point-to-point connection between the two devices. That is, no third device is disposed between the two devices that run the aggregation protocol. FIG. 1, however, shows just such a third device (switch 30) being coupled between aggregation-based server 20 and aggregation-based switch 40. Switch 30 in the embodiments discussed herein is assumed to be incapable of forming teams from among its ports 32 and to be incapable of implementing an aggregation protocol. As such, switch 30 is referred to as a "non-aggregation-based switch." FIG. 1 thus depicts a aggregation-based server 20 coupled to a non-aggregation-based switch 30 and the non-aggregation-based switch 30 being coupled to a aggregation-based switch 40. Neither aggregation-based device (server 20 or switch 40) couple directly to another aggregation-based device.

A network in which a aggregation-based device implements an aggregation protocol when connected to a non-team based device may operate erroneously. For example, a frame may not be correctly routed. The embodiments of the invention solve this problem.

In general, each frame sent through a network has a destination address (e.g., a layer 2 media access control (MAC) address). Some destination addresses pertain to specific network devices such as servers, switches, storage device, etc. Other addresses correspond to a multicast address. When a switch receives a frame having a multicast address, the switch broadcasts that frame through all of that switch's ports, except, in at least some embodiments, the port on which the frame was provided to the switch. Often, multiple multicast addresses are provided for use in multicast operations. When a network device implements an aggregation protocol (e.g., LACP), each frame transmitted by that network device has a destination address that comports with a specific multicast address. The use of a predetermined, specific multicast address permits a network device that implements the aggregation protocol to recognize the frame as an aggregation frame configured to be transmitted across a team of ports or NICs. Although an aggregation frame uses a multicast address, a switch receiving such a frame will not broadcast the frame. The aggregation protocol is a point-to-point protocol and thus all switches that implement the aggregation protocol do not multicast such frames. Instead, a switch receiving an aggregation frame uses the data in the frame to make aggregation protocol decisions concerning the state of the switch's own ports that directly connect to another network device implementing the same aggregation protocol. The network devices negotiate the use of port aggregation until a final port state is determined (see IEEE 802.3ad, incorporated herein by reference, for more details). Once the network device is finished using the information in the aggregation-based frame, the network device discards the frame and does not forward/route it to any other network device.

A network device that does not implement the aggregation protocol (e.g., non-aggregation-based switch 30) will not recognize the frame as being an aggregation frame and, instead, will broadcast the frame out all of its ports (except the port on which the frame was received) in accordance with the multicast address. That is, switch 30 will detect the multicast address in an aggregation frame received on a port from server 20 or switch 40 and treat such a frame as any other multicast frame by broadcasting the frame out all other ports. As a result, two network conditions can occur when a aggregation-based device implementing an aggregation protocol connects to another device that does not implement the aggregation protocol. These two conditions are illustrated with respect to FIGS. 3 and 4. Each of the two conditions are detectable by embodiments of the invention and are dealt with accordingly, as will be described.

Figure 3:
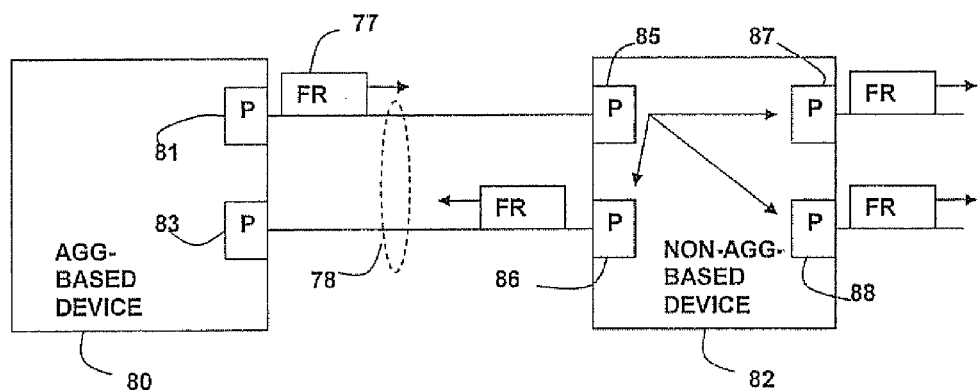
FIG. 3 illustrates a network condition detectable by embodiments of the invention.

With regard to FIG. 3, a aggregation-based device 80 is shown coupled to a non-aggregation-based device 82. The aggregation-based device 80 comprises ports or NICs 81 and 83 combined together to form a team 78. In the example of FIG. 3, aggregation-based device 80 transmits an aggregation frame 77 from port 81 to port 85 of non-aggregation-based device 82. As explained above, an aggregation frame from an aggregation-based device has, among other information, a predetermined multicast address by which other aggregation-based devices recognize the frame as an aggregation frame. In that device 82 is not a aggregation-based device, device 82 detects the multicast address in the frame and broadcasts the frame out its other three ports 86, 87, and 88 as shown. In particular, the frame is transmitted out port 86 of device 82 to port 83 of the aggregation-based device 80. The frame thus returned to device 80 is the same or substantially the same as the frame that was initially transmitted out port 81. Because a aggregation-based device that receives an aggregation frame is not supposed to resend the frame on another port, aggregation-based device 80 should never receive an aggregation frame (from another aggregation-based device) that device 80 originated.

In accordance with embodiments of the invention, an aggregation frame includes various pieces of information comprising the predetermined multicast address described previously as well as a system identifier (ID) and a source port value. Each network device generates or is otherwise assigned a system ID that uniquely identifies that device. Each aggregation-based device (e.g., device 80 in FIG. 3) provides its system ID to each member of a team. For example, device 80 provides its system ID to team members 81 and 83 of team 78. Any frame transmitted by a network device is embedded with that device's system ID by the team member (or port) transmitting the frame. In the context of the LACP protocol, the system ID comprises the "actor's system identifier." The source port value also included in the frame identifies the particular network device port that transmitted the frame.

The aggregation-based device 80 can detect the network condition illustrated in FIG. 3 upon receiving the frame on port 83. The device 80 retrieves the system ID from the received frame and compares that system ID to the system ID of its ports 81, 83. If the system IDs match, then the device 80 has detected that it has received a frame that the device 80 originated—a condition which should not have occurred if device 82 was a aggregation-based device implementing the aggregation protocol. That the system IDs match informs the device 80 that device 82 is not a aggregation-based device implementing an aggregation protocol.

Figure 4:
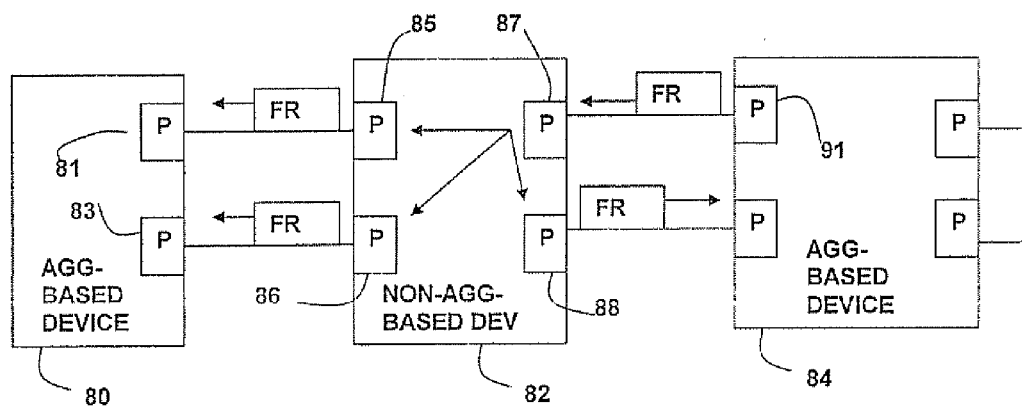
FIG. 4 illustrates another network condition detectable by embodiments of the invention.

FIG. 4 illustrates another network condition that occurs because device 82 is not a aggregation-based device implementing an aggregation protocol. In the example of FIG. 4, non-aggregation-based device 82 couples to two aggregation-based device 80 and 84 as was the case for the embodiment of FIG. 1. Aggregation-based device 84 transmits a frame from its port 91 to port 87 of the non-aggregation-based device 82. Non-aggregation-based device 82 multicasts the frame to its other three ports 85, 86, and 88 as is the nature of a non-aggregation-based device receiving a frame having a multicast destination address. Copies of the frame are transmitted out ports 85 and 86 of the non-aggregation-based device 82 to ports 81 and 83, respectively, of the aggregation-based device 80. The frame copies received on ports 81 and 83 have the same system ID because both frames originated from device 84. The frames will also have the same source value because port 91 originated the frame. Aggregation-based device 80 determines that it has received two frames on different team members (ports/NICs) that have the same system ID and source port value—a condition which should not have occurred if device 82 was a aggregation-based device implementing the aggregation protocol. That the system IDs and source port values of frames received on two different ports match informs the device 80 that device 82 is not a aggregation-based device implementing an aggregation protocol or that an error condition has occurred in the network that is preventing the aggregation protocol from operating correctly.

In accordance with embodiments of the invention, each aggregation-based device in the network continually monitors for one or both of the conditions described above. Upon detecting either or both of the conditions described above, a aggregation-based device discontinues implementing its aggregation protocol, disbands its teams and operates as a non-team based device.

Figure 5:
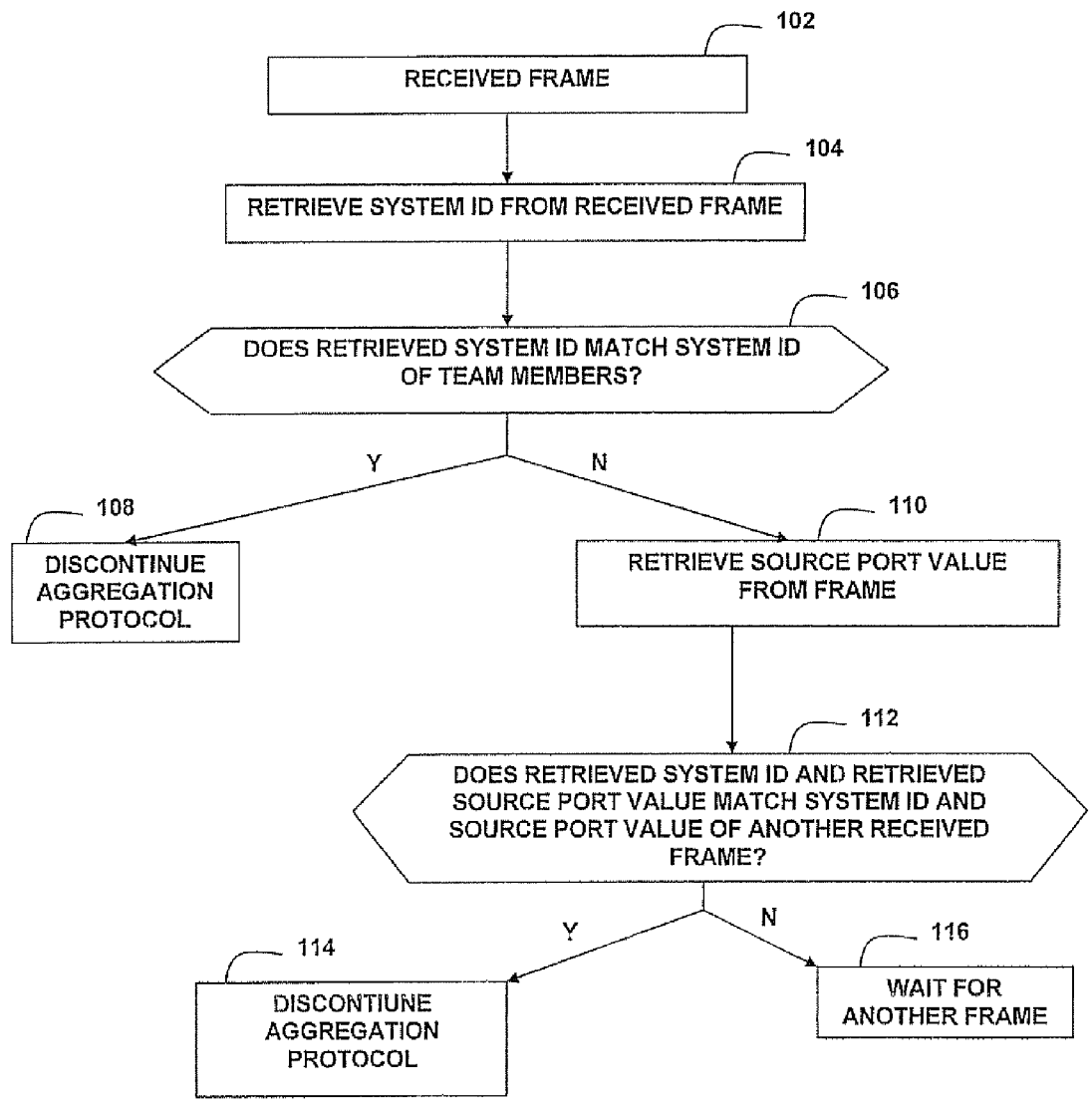
FIG. 5 illustrates a method in accordance with embodiments of the invention.

FIG. 5 shows a method implemented on some or all aggregation-based devices in a network. In accordance with embodiments of the invention, method is performed by a aggregation-based device every time such a device receives a frame. The various actions shown in FIG. 5 can be performed in the order shown or in a different order. Some of the actions can be combined together and performed concurrently.

At 102, the device receives a frame. At 104, the device retrieves the system ID from the received frame. At 106, the device determines whether the retrieved system ID matches a system ID of its team members (ports/NICs). The condition detected at 106 is the condition depicted in FIG. 3. If there is a match, then at 108 the device discontinues implementing (i.e., disables) its aggregation protocol. Disabling the aggregation protocol may entail setting/clearing a bit in a configuration register. If there is no match between the retrieved system ID from the received frame and a system ID of its team members, then the other condition discussed above with regard to FIG. 4 is determined. At 110, the source port value is retrieved from the received from. At 112, the device determines whether the retrieved system ID and retrieved source port value match the system ID and source port value of another received frame. If a match is detected at 112, then at 114 the device's aggregation protocol is discontinued. Otherwise, at 116, the device waits for another frame to be received.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
   on a first port, receiving a frame from a network device;
   determining whether the received frame includes a system identifier (ID) and a source port value that matches a system ID and a source port value corresponding to a second port; and
   as a result of determining that said received frame system ID and a source port value matches said second port's system ID and a source port value, discontinuing an aggregation protocol;
   wherein said aggregation protocol enables multiple ports to be operated together as a virtual port.

2. The method of claim 1 further comprising continuing to implement said aggregation protocol as long as said received frame system ID does not match said second port's system ID and said received frame's system ID and source port value do not match the system ID and source port value contained in the frame received on the second port.

3. The method of claim 1 wherein said aggregation protocol is the Link Aggregation Control Protocol.

4. A method, comprising:
   on a first port, receiving a frame from a network device;
   determining whether the received frame includes a system identifier (ID) and a source port value both of which match a system ID and a source port value contained in another frame received on a second port; and
   as a result of determining that said received frame system identifier and source port value match said system identifier and source port value contained in the other frame received on the second port, discontinuing an aggregation protocol;
   wherein said aggregation protocol enables multiple ports to be operated together as a virtual port.

5. The method of claim 4 wherein said aggregation protocol is the Link Aggregation Control Protocol.

6. A network device, comprising:
   a plurality of network ports; and
   control logic coupled to said network ports, said control logic adapted to receive a frame on a first port, to determine whether the received frame includes a system identifier (ID) and a source port value that matches a system ID and a source port value corresponding to a second port, and, as a result of determining that said received frame system ID and a source port value matches said second port's system ID and a source port value, discontinuing an aggregation protocol;
   wherein said aggregation protocol enables at least some of said ports to be operated together as a virtual port.

7. The network device of claim 6 wherein said control logic implements said aggregation protocol as long as said received frame system ID does not match said second port's system ID and as long as said received frame's system ID and source port value do not match the system ID and source port value contained in the frame received on the second port.

8. The network device of claim 6 wherein said aggregation protocol is the Link Aggregation Control Protocol.

9. The network device of claim 6 wherein said network device comprises a server and said network ports comprise network interface controllers (NICs).

10. The network device of claim 6 wherein said network device comprises a network switch.

11. The network device of claim 6 wherein said network ports comprise ports selected from a group consisting of switch ports and network interface controller ports.

* * * * *